Feb. 26, 1929.                J. H. PETERS                1,703,206
                       SEQUENTIAL CONTROL APPARATUS
                          Filed March 19, 1927
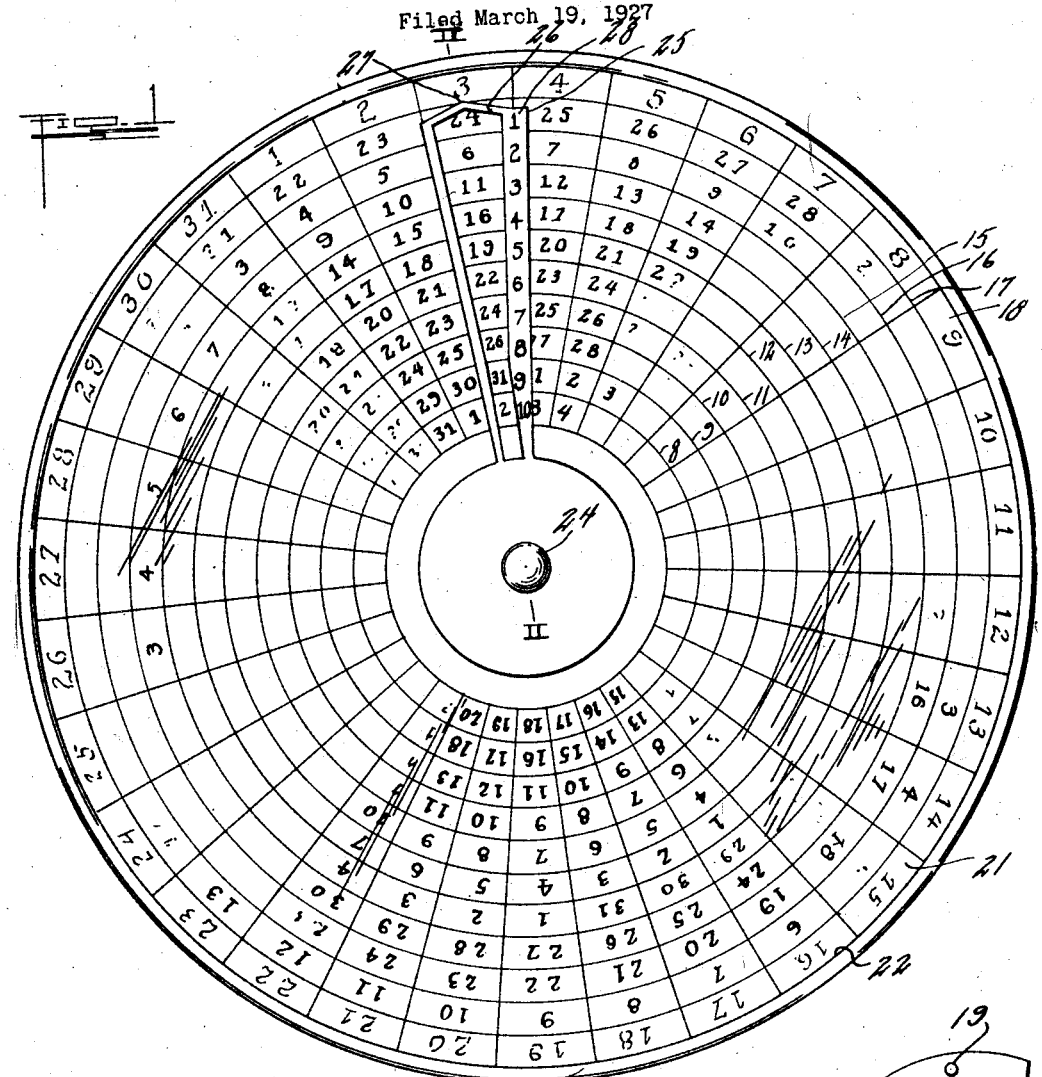
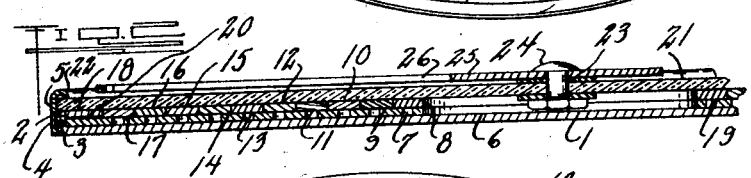
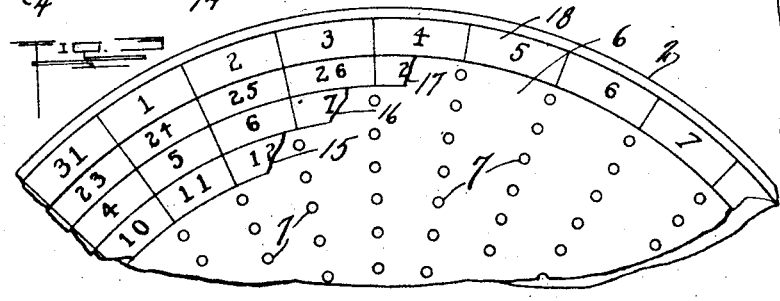
Inventor
John H. Peters
By
Geo. E. Kirk
Attorney Patented Feb. 26, 1929.

1,703,206

UNITED STATES PATENT OFFICE.

JOHN H. PETERS, OF TOLEDO, OHIO.

SEQUENTIAL CONTROL APPARATUS.

Application filed March 19, 1927. Serial No. 176,823.

This invention relates to flexibility in determining sequence for different series of things, more particularly with susceptibility for various relations between the series.

This invention has utility when incorporated in identifications for the different series as unitary for the series for the respective series but relatively adjustable as to said units, with a readily shiftable indicator which discloses interseries data. Especial value attaches in connection with timing of items or matters even as to differences in desired sequence of control, as in collection of accounts and follow ups. Under these circumstances it may be desired to have one sequence at one time and a greater or less different sequence at another time.

Referring to the drawings:

Fig. 1 is a plan view of an apparatus as a control or governing chart which carries out the invention hereof;

Fig. 2 is a section on the line II—II, Fig. 1;

Fig. 3 is a fragmentary plan view; and

Fig. 4 is a fragmentary bottom plan of one of the members or rings.

Base 1 is shown as having upstanding marginal flange 2 with openings 3 therein for screws 4, as extending through rim 5. On the base 1 within the range of the flange 2 there is shown member 6 carrying a plurality of seats 7. Upon this member 6 is disposed a plurality of concentric rings 8, 9, 10, 11, 12, 13, 14, 15, 16, 17, 18. These rings 8 to 17 inclusive, on the reverse sides carry seat means as lug 19 for entering a recess 7 in the member 6. On the upper side each of these rings 8 to 18 inclusive is herein shown as carrying a unitary series of indications.

In the instance the matter of dates involves days per month instead of other groups, these unitary series may be of the maximum of the days per month as 31 in each series and may have convenience for consecutive arrangement as a unitary series for each of the rings. However, it is to be noted that as between the rings, each ring is angularly independently adjustable as to each of the rings except as to the ring 18 which may be anchored as by adhesive 20 against disturbance as to the member 6. This fixing of the position of member 18 as to the member 6 makes such a unitary structure and the remaining rings are thus independently adjustable relatively to this ring 18 and as to each other. But such adjustments made is one maintaining radial interseries groupings for the indication on the different rings.

At the desired position of the adjustable rings relatively to each other and to the ring 18, the locking cover plate or transparency 21 may be placed into holding relation in contact with these several rings and then the rim 5 assembled therewith to have its overhang 22 embrace the glass plate 21 and when the screws 4 are brought into operative position there is effected a unitary assembly of the device.

This glass plate 21 is shown as having central opening 23 in which is mounted stud 24 as a bearing coaxial with the rings. This bearing is shown as mounting arm 25 having radially extending opening 26, terminal pointer 27 and, adjacent the window 26, series of ring disclosing indications 28. As occasion may arise for changing the relative relation between a ring or rings for thereby introducing a different sequence, the cover plate 21 is removed and such ring or rings given the new location. Thereafter the cover plate 21 is replaced and the device is in condition for operation under the changed schedule.

In the operation of this device this arm 25 may have its pointer 27 to a notation on ring 18 as one series thereby disclosing a desired sectional relation through the window 26 as to the notations on the plurality of relatively independent rings 17 to 8 inclusive. In the instance herein shown the notations on the ring 18 may be of the days of a month. In the adaptation of the device for chronological sequence determinations say in the matter of handling of accounts for collection as in installment matters, these series of notations disclosed through the window 26 may identify the date a certain course is desired to be acted upon. There is value inherent in this grouping and flexibility for indication in that the collection cards may be placed in their locations alphabetically if desired, under which circumstances the due date as shown on the card may be the location for the indicator 27 of the arm 25. Assuming such to be the 3rd of the month, the one using this governing chart, may find the date of the check up to be the 24th of the month, for say on such date to send out a ten days in advance notice in the account as to the item to be due the 3rd of the following month, as a reminder.

In practice, it is usually more convenient instead of filing the cards alphabetically or geographically or as to the character of items of merchandise, realty, etc., to file such in the sequence of the dates. Under such instance all cards having payments due on the 3rd of the month may thus disclose at this instance the grouping as to which radial series outer member or ring 17 has its pertinence as disclosed ten days or other interval advance notice, that the account is due and payment as to the amount on the 3rd of the succeeding month. The particular item of this ring 17 is checked by the notation of the indications 28 on the adjustable arm 25.

In the real working of this governing chart it may be assumed that the cards for the accounts are arranged chronologically and that it is the 3rd of the month. Swinging the arm 25 to disclose the notation 3 in ring 17 there is at once a check that as to the cards which will become due 13th notices for payment should be sent out on this sequence which has been discussed of ten days advance notice. As to ring 16 region of the arm 25 we find that on this current date of 3rd it is in order for items due the 31st of the preceding month, which have not been paid, to have such receive delinquency follow-up. In this instance such is given attention on the current date of 3rd for cards of 31st ult., making three day interval for notices to be sent out as to such failure to pay as to all of these cards or accounts due the 31st which are still unpaid. These matters of dates sequence or what has transpired may, of course, be adapted to any set of facts desired but in the instance shown these are disclosed as for special forms of special value and peculiar worth therein as simplifying accounting; reducing the help necessary; and expediting the manipulations throughout. The chronology of the card as originally placed is maintained at all times and by the governing chart herein the particular date of the month on the rings as within the radial series of notations 28 is located for such day of the month with this location of the pointer 28 disclosing the account chronology as to the notation on the ring 18 so that all the clerk is required to do is to locate such group of cards and for that day send out the notices, whether such be ten days or other advance days notices that the account is due as disclosed by the ring; whether it be for non-payment as a notice say three days thereafter as set up by the adjustments given by the arm 25 as cooperating with the ring 16 or whether it be the greater default of say eight days which may be the ring 15 which would mean the cards having the due date of the 26th of the month. The follow up for the next may be say for eighteen days and would show the items due the 21st should be given follow up which may be by form, by phone, by telegraph, by solicitation, or by messenger or other means, under the circumstances as adopted and so all down through the rings until the cards are clear as of the dates. It is accordingly seen this is a simple chart permitting location of reflected check chronology for a current date as to a set of happenings which it may be desirable to have occur in connection with items carried to a date which has not been disturbed. This leaves the cards of the due dates always in undisturbed sequence for ready location, while there is involved this governing check for acting upon such cards as to dates constantly at variance therefrom.

As an instance for the day's work in matter of a collection schedule, assuming the day to be say Apr. 1, 1927, the window may be swung to the position for "1" on ring 17, then for "1" on each of the rings in succession inwardly thereform. At this series of positions, the window will indicate the card dates on the outer ring 18 from which cards are to be handled for the schedule as governed by this chart, and under the sequence as herein shown may be with the operations designated by the rings at the side of the window to be:

| | | |
|---|---|---|
| Operation 1 | Notice of Maturity | Apr. 11, 1927. |
| Operation 2 | Notice of Non-Payment | Mar. 29, 1927. |
| Operation 3 | A–1 Letter to Purchaser | Mar. 24, 1927. |
| Operation 4 | A–2 Letter to Purchaser | Mar. 19, 1927. |
| Operation 5 | {A–3 Letter to Purchaser<br>{A–4 Letter to Dealer | }Mar. 16, 1927. |
| Operation 6 | A–5 Letter to Purchaser | Mar. 13, 1927. |
| Operation 7 | A–6 Wire to Purchaser | Mar. 11, 1927. |
| Operation 8 | {A–7 Letter to Purchaser<br>{A–8 Letter to Dealer | }Mar. 9, 1927. |
| Operation 9 | Special Action | Mar. 4, 1927. |

The notice of maturity as herein discussed may be a form sheet, a form letter, a telegram, a reminder to send a messenger, or for phoning. The essence of this disclosure is that the dates which may have a schedule relation more particularly desirable for meeting a certain business situation are mnemonics for the accounting department, so that with a minimum of follow-up requirement, there may be had readily available a check up. The operation sequence as disclosed may vary, but in the one herein adopted, it is of ten days advance notice with eight and thirteen day default follow-up checks, with subsequent following up on sixteen, nineteen, twenty-one, twenty-three, and twenty-seven day periods. Of course, if payment is made at maturity, as a result of sending out the notice, the card may be placed in a different grouping, or given an identifying marking if left in the original grouping. In this latter instance the maintained arrangement is thus held for a monthly payment plan of installments. Likewise the identification for discontinuing the follow-up schedule may be adopted once the matter is cleared as to such card.

What is claimed and it is desired to secure by Letters Patent is:

1. A delinquent account control chart embodying a mounting, independent ring members separately angularly positionable in said mounting and having a plurality of annular series of indications disposed in concentric relation as assembled with the mounting, means for retaining the members in adjusted angular relation for maintenance of a predetermined radial sequence of the indications, and a radially disposed arm, there being a radial series of member identification means carried by the arm.

2. A plate provided with sides, concentric rings in abutting relation and carrying indications in series, a cover for the rings, there being provided an indicator for disclosing indications in a selected supplemental series transversely as to the different rings, and anchoring means for retaining the cover and rings assembled.

3. Means providing a primary series of notations, in proximity thereto relatively independently adjustable members each having a series of similar secondary notations, and a movable indicator extending from the primary notation series and transversely of the several secondary series of notations.

In witness whereof I affix my signature.

JOHN H. PETERS.